United States Patent [19]

Uyama

[11] Patent Number: 4,747,336

[45] Date of Patent: May 31, 1988

[54] SHELL CONNECTING STRUCTURE FOR BOOSTER

[75] Inventor: Shintaro Uyama, Saitama, Japan

[73] Assignee: Jidosha Kiki Co., Ltd., Tokyo, Japan

[21] Appl. No.: 35,961

[22] Filed: Apr. 8, 1987

[30] Foreign Application Priority Data

Apr. 18, 1986 [JP] Japan .............................. 61-58360[U]

[51] Int. Cl.$^4$ .............................................. F15B 9/10
[52] U.S. Cl. .................. 91/376 R; 92/98 D; 92/99; 60/547.1
[58] Field of Search ............. 92/98 D, 99; 91/369 A, 91/376 R, 376; 60/547.1; 220/67, 75, 76

[56] References Cited

U.S. PATENT DOCUMENTS

| | | | |
|---|---|---|---|
| 2,122,904 | 7/1938 | Ambrosius | 220/67 |
| 2,346,685 | 4/1944 | Hothersall | 220/76 |
| 2,969,046 | 8/1958 | Kellogg et al. | 92/99 |
| 3,053,235 | 3/1961 | Hager | 92/99 |
| 3,109,346 | 6/1961 | Julow | 92/98 D |
| 3,146,682 | 4/1962 | Price et al. | 92/99 |
| 3,158,930 | 5/1961 | Wesstrom et al. | 29/510 |
| 3,613,506 | 10/1971 | Kytta | 91/369 A |
| 3,656,413 | 4/1972 | Eggstein | 92/98 D |
| 4,296,680 | 10/1979 | Ohta et al. | 92/98 D |
| 4,604,944 | 8/1986 | Tsubouchi | 92/98 D |
| 4,632,014 | 12/1986 | Endo | 60/547.1 |

FOREIGN PATENT DOCUMENTS 57-74259  5/1982  Japan .
2088000  6/1982  United Kingdom ............... 92/98 D

OTHER PUBLICATIONS

Drawings. (FIGS. 1a, 1b, 2, 3 and 4) from U.S. Ser. No. 252,553.

*Primary Examiner*—Robert E. Garrett
*Assistant Examiner*—Thomas Denion
*Attorney, Agent, or Firm*—Flynn, Thiel, Boutell & Tanis

[57] ABSTRACT

A shell connecting structure as used in a brake booster for holding a peripheral bead of a diaphragm between a front and a rear shell in a hermetically sealed manner. The front and the rear shell are connected together at a location radially outward of a power piston to thereby reduce an axial size of the shells while simultaneously minimizing a radial size of the connecting portion and hence the shells.

7 Claims, 3 Drawing Sheets

SHELL CONNECTING STRUCTURE FOR BOOSTER

FIELD OF THE INVENTION

The invention relates to a shell connecting structure which integrally connects a front and a rear shell of a brake booster or the like together, and more particularly, to a shell connecting structure which maintains a hermetic seal of a peripheral bead of a diaphragm between such pair of shells.

DESCRIPTION OF THE PRIOR ART

A booster such as a brake booster or clutch booster generally comprises a front and a rear shell which are coupled together, a power piston disposed within the shells so as to be reciprocable in its axial direction, and a diaphragm which is applied to the rear surface of the power piston. The diaphragm extends axially forward from the outer periphery of the power piston and is then folded back so as to extend rearwardly and outwardly, thereby forming a folded portion which is U-shaped in cross section. A peripheral bead is formed on the outer end of the folded portion and is held between the front and the rear shell in a hermetically sealed manner. A variety of constructions have been proposed in the prior art to provide a shell connecting structure in which the front and the rear shell are coupled together with the peripheral bead of the diaphragm held there between in a hermetically sealed manner.

By way of example, a connecting structure which minimizes the maximum diameter of the shells is disclosed in Japanese Laid-Open Patent Application No. 74,259/1982 in which the rear shell is fitted into a rear opening formed in the front shell, and the rear opening of the front shell is bent radially inward where the front and the rear shell are fastened together. An arrangement which is similar to the present invention is disclosed in U.S. Pat. No. 3,053,235. In the former arrangement, the maximum diameter of the shells can be minimized, but since the fastening region is located rearward of the power piston, the axial size of the booster increases. If the diameter of the power piston is reduced in order to avoid an increase in the axial size, a reduction in the output results. By contrast, in the connecting structure of the latter arrangement, the front and the rear shell are connected together at a location which is radially outward of the power piston, thus enabling the axial size of the booster to be reduced. However, this disadvantageously increases the maximum diameter of the shells.

SUMMARY OF THE INVENTION

In view of the foregoing, it is an object of the invention to provide a shell connecting structure for a booster in which a front and a rear shell are connected together at a location which is radially outward of a power piston and in which the radial size of the connected parts is minimized, thus reducing the maximum diameter and the axial size of the shells simultaneously and as much as possible.

Specifically, the construction of a conventional booster is modified according to the invention by forming a first cylindrical portion which opens in the rearward direction around the outer periphery of a front shell, and forming a first step in the first cylindrical portion so that a portion located rearward of the first step has an increased diameter while a portion located forward of the first step has a reduced diameter. A second cylindrical portion which opens in the forward direction is formed around the outer periphery of a rear shell. The front end portion around the opening of the second cylindrical portion is folded back upon itself so as to be in tightly overlapping relationship with the fold-back portion having an external diameter which is less than the internal diameter of the cylindrical portion having a reduced diameter of the front shell by an amount which is equal to or greater than the thickness of the diaphragm. The rear end of the fold-back portion is bent to extend radially outward to define a second step therein which is substantially in axially opposing relationship with the first step so that the second step of the rear shell may be fitted into the cylindrical portion of the front shell having an increased diameter to permit the peripheral bead of the diaphragm to be held between the first and the second step and also between the internal peripheral surface of the cylindrical portion of an increased diameter and the outer peripheral surface of the fold-back portion in a hermetically sealed manner. The power piston is disposed inside the fold-back portion, which is in turn disposed inside the portion of the diaphragm which is folded back.

With the described arrangement, the area of connection between the front and the rear shell is located radially outward of the power piston, permitting the axial size of the shells to be reduced. The choice of the external diameter of the fold-back portion which is less than the internal diameter of the cylindrical portion of the front shell having a reduced diameter by an amount equal to or greater than the thickness of the diaphragm allows such fold-back portion to be disposed within the portion of the diaphragm which is folded back and which represents a dead space. The peripheral bead of the diaphragm is disposed between the internal peripheral surface of the cylindrical portion of an increased diameter and the fold-back portion having a reduced diameter, thereby allowing the external diameter of such cylindrical portion and hence the maximum diameter of the shells to be minimized.

Above and other objects, features and advantages of the invention will become apparent from the following description of several embodiments thereof with reference to the drawings.

DETAILED DESCRIPTION OF EMBODIMENTS

Figure 1:
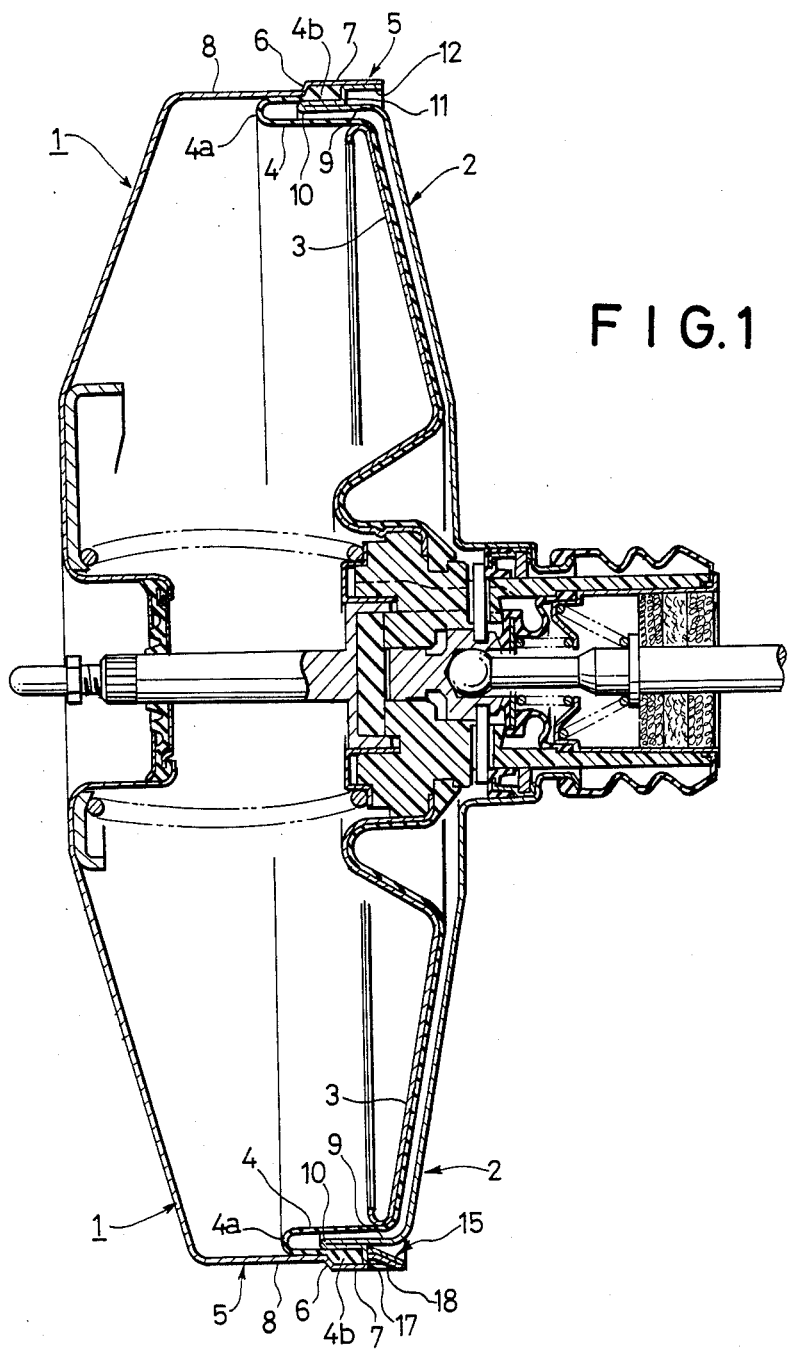
FIG. 1 is a cross section, taken along the line I—I shown in FIG. 2, of an embodiment according to the invention.
Figure 2:
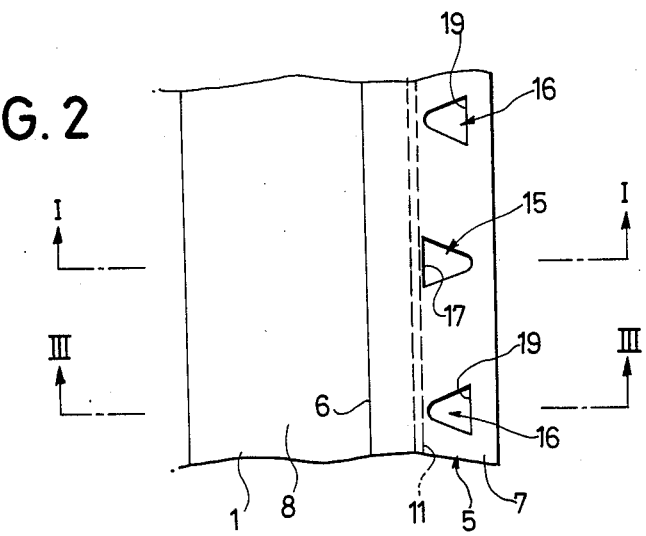
FIG. 2 illustrates the profile of part shown in FIG. 1.
Figure 3:
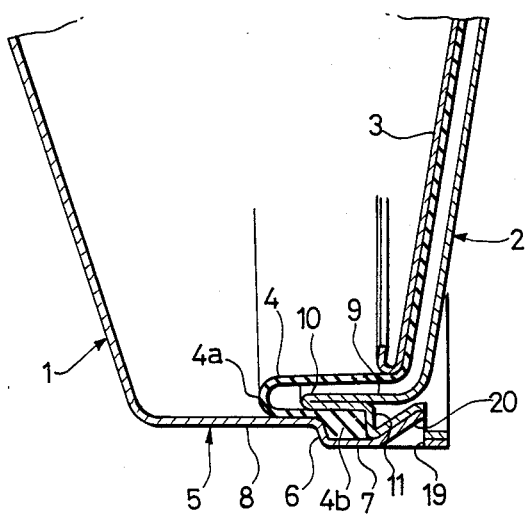
FIG. 3 is cross section taken along the line III—III shown in FIG. 2.
Figure 4:
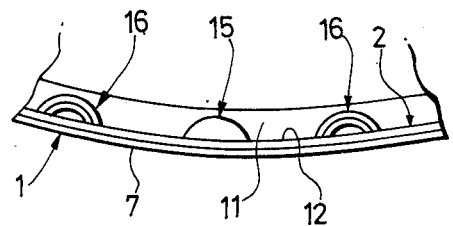
FIG. 4 is a right-hand side elevation of FIG. 2.

Referring to the drawings, the invention as applied to shells of a brake booster will now be described. Referring to FIG. 1, a brake booster shown includes a front shell 1 and a rear shell 2, with a power piston 3 disposed in a space defined by the both shells so as to be reciprocable in the axial direction.

A diaphragm 4 is applied to the back side of the power piston 3, and extends axially forward beyond the periphery of the power piston 3 and is then folded back so as to present a U-shaped cross section, thus defining a fold-back portion 4a. The rear end of the fold-back portion 4a forms a peripheral bead 4b.

The front shell 1 is generally in the form of a cylinder having a closed bottom, and its peripheral portion is formed with a first cylindrical portion 5 which opens rearward or toward the rear shell 2. A first step 6 is formed in the first cylindrical portion 5 which defines a boundary between a rearwardly located cylindrical portion 7 of an increased diameter and a forwardly located cylindrical portion 8 of a reduced diameter.

The rear shell 2 is also in the form of a cylinder having a closed end, but has a depth which is less than the depth of the front shell 1. Its periphery is formed with a second cylindrical portion 9 which opens forwardly or toward the front shell 1. The end portion of the second cylindrical portion 9 is folded back upon itself so as to be in tight contact with the forwardly extending portion, such region forming a tight contact being denoted by numeral 10. The rear end of the tight contacting portion 10 is bent to extend radially outward to define a second step 11 which is axially opposite to the first step 6. The rear shell 2 also includes a second cylindrical portion 12 which extends rearwardly beyond the second step and which is adapted to be a tight fit in the cylindrical portion 7 of an increased diameter.

The tightly contacting portion 10 has an external diameter which is less than the internal diameter of the cylindrical portion 8 of a reduced diameter which is located to the left of the first step 6 so that a difference therebetween substantially matches the thickness of the body portion of the diaphragm 4. The peripheral bead 4b of the diaphragm 4 has a thickness which is equal to or greater than twice the thickness of the body portion while a spacing or difference between the external diameter of the tightly contacting portion 10 and the internal diameter of the cylindrical portion 7 of an increased diameter located to the right of the first step 6 is chosen to be substantially equal to or slightly less than the thickness of the peripheral bead 4b. The peripheral bead 4b has an internal diameter which is chosen to be slightly less than the external diameter of the tightly contacting portion 10 so that the peripheral bead 4b can be fitted around the portion 10 by its own resilience. The tightly contacting portion 10 is located and sized so that its front end extends forwardly slightly beyond the first step 6 when the front shell 1 and the rear shell 2 are connected together.

Referring to FIGS. 1 to 4, both the first cylindrical portion 5 and the second cylindrical portion 12 are formed with a plurality of alternating detent pawls 15, 16 in their circumferential direction for preventing a separation of these cylindrical portions from each other. One of the detent pawls, 15, defines a circumferentially extending parting line 17 in both the first cylindrical portion 5 and the second cylindrical portion 12, and is shaped such that a portion thereof which is located rearward of the parting line 17 bulges radially inward to present an inclined surface 18 having a diameter which decreases in the axially forward direction. The parting line 17 is defined in alignment with the rear end face of the second step 11 formed in the rear shell 2 so that the front end face of the detent pawl 15 is capable of abutting against the rear end face of the second step 11. On the other hand, the other detent pawl 16 defines a circumferentially extending parting line 19 in both the first cylindrical portion 5 and the second cylindrical portion 12 in the similar manner as the detent pawls 15, and is shaped such that a portion thereof which is located forward, rather than rearward, of the parting line 19 bulges radially inward to present an inclined surface 20 of an opposite slope to the slope of the inclined surface 18, thus having a diameter which decreases in the axial rearward direction.

When connecting the front shell 1 and the rear shell 2 together, the peripheral bead 4b of the diaphragm 4 is initially disposed around the peripheral surface of the tightly contacting portion 10 of the rear shell 2. Since the internal diameter of the peripheral bead 4b is chosen to be slightly less than the external diameter of the tightly contacting portion 10 as mentioned previously, the peripheral bead 4b can be fitted around the tightly contacting portion 10 by its own resilience. Thereupon, the second cylindrical portion 12 of the rear shell 2 is fitted into the cylindrical portion 7 of an increased diameter of the front shell 1 until the peripheral bead 4b is held between the first step 6 in the front shell 1 and the second step 11 in the rear shell 2 so as to establish a hermetic seal therebetween. Subsequently, while maintaining the peripheral bead 4b held between the first step 6 and the second step 11 under a given pressure, a suitable device, not shown, is utilized to form the detent pawls 15 and then or simultaneously the detent pawls 16 using the rear end face of the second step 11 as a reference.

In the present embodiment, the maximum diameter of the shell will be the external diameter of the cylindrical portion 7 of an increased diameter of the front shell 1, but it will be understood that this external diameter exceeds the external diameter of the cylindrical portion 8 of a reduced diameter which is determined according to an output of the brake booster only slightly, namely, by an amount corresponding to the thickness of the body portion of the diaphragm 4, thereby allowing the maximum diameter of the shell to be minimized. In addition, the peripheral bead 4b of the diaphragm 4 is located not rearwardly of the power piston 3, but on the radial outside thereof, thus allowing the axial size of the shells to be minimized while enabling the maximum diameter of the shells to be minimized.

It will be seen that in the present embodiment, the detent pawls 15, 16 are formed to bulge radially inward, and hence the provision of these detent pawls do not increase the maximum diameter of the shells. In addition, because the detent pawls 15, 16 present inclined surfaces 18, 20 having opposite slopes, an integral connection between the front shell 1 and the rear shell 2 can be reliably achieved by these inclined surfaces. By forming the circumferentially extending parting lines along the axially opposite ends of the detent pawls 15, 16, their strength and rigidity may be increased over the strength and rigidity of pawls which are shaped to bulge radially inward at a location intermediate these parting lines, thus enhancing the durability and reliability of these detent pawls without increasing their axial size.

Figure 5:
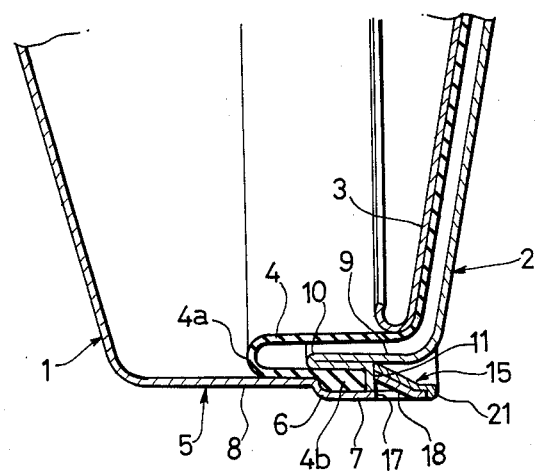
FIG. 5 is a cross section of another embodiment of the invention.
Figure 6:
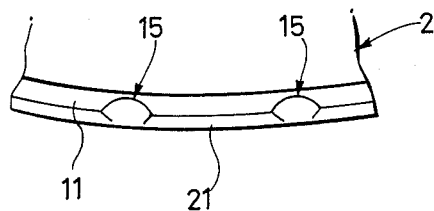
FIG. 6 is a right-hand side elevation of FIG. 5.

FIGS. 5 and 6 illustrate another connecting means which prevents a separation of the front shell 1 and the rear shell 2 from each other. In this embodiment, the detent pawls 16 are removed, and are replaced by an engaging portion 21 which is formed to extend circumferentially along the rear end face of the rear shell 2 and curved radially outward and which is disposed in abutment against the rear end face of the front shell 1 to prevent a displacement of the rear shell 2 to the left with respect to the front shell 1.

It should be understood that the connecting means which prevents a separation of the front and the rear shell from each other is not limited to those described above, but any suitable means may be used.

While several embodiments of the invention have been illustrated and described above, it should be understood that the invention is not limited thereto, but that a number of changes, modifications and substitutions will readily occur to one skilled in the art without departing from the spirit and the scope of the invention defined by the appended claims.

What is claimed is:

1. A shell connecting structure for a booster including a front and a rear shell which are connected together, a power piston disposed in a space defined by the shells so as to be reciprocable in its axial direction and a diaphragm applied to the back surface of the power piston, the diaphragm extending axially forward from the periphery of the power piston and then folded back to define a fold-back portion which is U-shaped in section, the rear end of the fold-back portion being formed with a peripheral bead which is adapted to be held between the front and the rear shell in a hermetically sealed manner, the periphery of the front shell being formed with a first cylindrical portion which opens rearwardly with a first step formed in the first cylindrical portion to provide a cylindrical section of an increased diameter and a cylindrical section of reduced diameter which are located rearward and forward of the first step, respectively, the periphery of the rear shell being formed with a second cylindrical portion which extends forwardly and which is tightly folded back into contact upon itself to provide a tightly contacting portion, said tightly contacting portion having an external diameter which is less than the internal diameter of the cylindrical section of reduced diameter of the front shell by an amount which is substantially equal to or greater than the thickness of the diaphragm, the rear end of the tightly contacting portion being bent so as to extend radially outward to define a second step therein which is substantially axially opposite to the first step, the second step in the rear shell being fitted into the cylindrical section of increased diameter of the front shell so that the peripheral bead of the diaphragm is held between the first and the second step and between the internal peripheral surface of the cylindrical section of increased diameter and the outer peripheral surface of the tightly contacting portion in a hermetically sealed manner, the power piston being disposed inside the tightly contacting portion, with the tightly contacting portion being located inside the fold-back portion of the diaphragm, said tightly contacting portion lying parallel to said cylindrical sections, said U-shaped fold-back portion of said diaphragm having cylindrical radially inner and outer sleeves, said radially outer sleeve being cylindrical and unstepped, the axially central portions of said radially inner sleeve of said diaphragm and said tightly contacting portion of said rear shell and said peripheral bead being radially aligned and of decreasing axial extent, so as to occupy a generally triangular cross-sectional space, such triangular space having a base defined by said radially inner sleeve of said diaphragm and an apex defined by said peripheral bead.

2. A shell connecting structure according to claim 1 in which the peripheral bead of the diaphragm has a thickness which is equal to or greater than approximately twice the thickness of a body portion of the diaphragm, and a spacing between the external diameter of the tightly contacting portion and the internal diameter of the cylindrical portion of increased diameter which is located rearward of the first step is equal to or slightly less than the thickness of the peripheral bead.

3. A shell connecting structure according to claim 1 in which the peripheral bead has an internal diameter which is slightly less than the external diameter of the tightly contacting portion so that the peripheral bead can be fitted around the tightly contacting portion by its own resilience, the tightly contacting portion being arranged so that its front end slightly extends forwardly beyond the first step when the front and the rear shells are connected together.

4. A shell connecting structure for a booster including a front and a rear shell which are connected together, a power piston disposed in a space defined by the shells so as to be reciprocable in its axial direction and a diaphragm applied to the back surface of the power piston, the diaphragm extending axially forward from the periphery of the power piston and then folded back to define a fold-back portion which is U-shaped in section, the rear end of the fold-back portion being formed with a peripheral bead which is adapted to be held between the front and the rear shell in a hermetically sealed manner, the periphery of the front shell being formed with a first cylindrical portion which opens rearwardly with a first step formed in the first cylindrical portion to provide a cylindrical section of an increased diameter and a cylindrical section of reduced diameter which are located rearward and forward of the first step, respectively, the periphery of the rear shell being formed with a second cylindrical portion which extends forwardly and which is tightly folded back into contact upon itself to provide a tightly contacting portion, said tightly contacting portion having an external diameter which is less than the internal diameter of the cylindrical section of reduced diameter of the front shell by an amount which is substantially equal to or greater than the thickness of the diaphragm, the rear end of the tightly contacting portion being bent so as to extend radially outward to define a second step therein which is substantially axially opposite to the first step, the second step in the rear shell being fitted into the cylindrical section of increased diameter of the front shell so that the peripheral bead of the diaphragm is held between the first and the second step and between the internal peripheral surface of the cylindrical section of increased diameter and the outer peripheral surface of the tightly contacting portion in a hermetically sealed manner, the power piston being disposed inside the tightly contacting portion, with the tightly contacting portion being located inside the fold-back portion of the diaphragm, the rear end face of the rear shell being formed with an engaging portion which is curved radially outward and which is disposed in abutment against the rear end face of the front shell, in which both the first and the second cylindrical portions are formed with detent pawls which prevent separation thereof from each other, each of the detent pawls being shaped by causing a portion thereof which is located rearward of a circumferentially extending parting line defined in the first or the second cylindrical portion to bulge radially inward so as to present an inclined surface having a diameter which decreases in the axially forward direction.

5. A shell connecting structure according to claim 4 in which the parting line is defined in alignment with the rear end face of the second step in the rear shell, the front end face of the detent pawl supporting the rear end face of the second step.

6. A shell connecting structure for a booster including a front and a rear shell which are connected together, a power piston disposed in a space defined by the shells so as to be reciprocable in its axial direction and a diaphragm applied to the back surface of the power piston, the diaphragm extending axially forward from the periphery of the power piston and then folded back to define a fold-back portion which is U-shaped in section, the rear end of the fold-back portion being formed with a peripheral bead which is adapted to be held between the front and the rear shell in a hermetically sealed manner, the periphery of the front shell being formed with a first cylindrical portion which opens rearwardly with a first step formed in the first cylindrical portion to provide a cylindrical section of an increased diameter and a cylindrical section of reduced diameter which are located rearward and forward of the first step, respectively, the periphery of the rear shell being formed with a second cylindrical portion which extends forwardly and which is tightly folded back into contact upon itself to provide a tightly contacting portion, said tightly contacting portion having an external diameter which is less than the internal diameter of the cylindrical section of reduced diameter of the front shell by an amount which is substantially equal to or greater than the thickness of the diaphragm, the rear end of the tightly contacting portion being bent so as to extend radially outward to define a second step therein which is substantially axially opposite to the first step, the second step in the rear shell being fitted into the cylindrical section of increased diameter of the front shell so that the peripheral bead of the diaphragm is held between the first and the second step and between the internal peripheral surface of the cylindrical section of increased diameter and the outer peripheral surface of the tightly contacting portion in a hermetically sealed manner, the power piston being disposed inside the tightly contacting portion, with the tightly contacting portion being located inside the fold-back portion of the diaphragm, the first and second cylindrical portions being formed with a plurality of alternating detent pawls distributed circumferentially for preventing separation of said cylindrical portions from each other, first ones of said detent pawls defining a first circumferentially extending parting line in said cylindrical portions and being shaped such that a part thereof located rearward of the first parting line bulges radially inward to present an inclined surface having a diameter which decreases in a axially forward direction, said detent pawls including second detent pawls alternating with said first detent pawls, said second detent pawls defining a second circumferentially extending parting line in said cylindrical portions and being shaped such that a portion of said second detent pawl located forward of said second parting line bulges radially inward to present an inclined surface of opposite slope to the slope of said inclined surface of said first detent pawl and thus having a diameter which decreases in the axial rearward direction, the oppositely sloping inclined surfaces of the first and second detent pawls forming an integral connection between the front and rear shells, the circumferentially extending first and second parting lines being axially spaced to double the circumferential distance between detent pawls associated with each parting line and thereby increasing the rigidity of said shells adjacent said detent pawls.

7. A shell connecting structure according to claim 6 in which the first parting line is defined in alignment with the rear end face of the second step in the rear shell, the front end face of the first detent pawl supporting the rear end face of the second step.

* * * * *